US007062504B2

(12) United States Patent
Cantu-Paz et al.

(10) Patent No.: US 7,062,504 B2
(45) Date of Patent: Jun. 13, 2006

(54) CREATING ENSEMBLES OF OBLIQUE DECISION TREES WITH EVOLUTIONARY ALGORITHMS AND SAMPLING

(75) Inventors: Erick Cantu-Paz, Oakland, CA (US); Chandrika Kamath, Tracy, CA (US)

(73) Assignee: The Regents of the University of California, Oakland, CA (US)

( * ) Notice: Subject to any disclaimer, the term of this patent is extended or adjusted under 35 U.S.C. 154(b) by 462 days.

(21) Appl. No.: 10/133,992

(22) Filed: Apr. 25, 2002

(65) Prior Publication Data

US 2003/0204508 A1    Oct. 30, 2003

(51) Int. Cl.
*G06F 17/00* (2006.01)
(52) U.S. Cl. .......................... 707/102; 706/20; 706/45
(58) Field of Classification Search ..... 707/100–104.1; 706/19–20, 45–52
See application file for complete search history.

(56) References Cited

U.S. PATENT DOCUMENTS

| 5,787,425 A | 7/1998 | Bigus |
| 6,351,561 B1 * | 2/2002 | Iyengar ...................... 382/226 |
| 2003/0061213 A1 * | 3/2003 | Yu et al. ......................... 707/7 |

OTHER PUBLICATIONS

Cantu-Paz et al. ("Using Evolutionary Algorithms to Induce Oblique Decision Trees," Lawrence Livermore National Laboratory, accepted for publication in the Genetic and Evolutionary Computation Conference (GECCO-2000), 2000, 8 pages).*
Dietterich ("An Experimental Comparison of Three Methods for Constructing Ensembles of Decision Trees: Bagging, Boosting, and Randomization", Machine Learning, Kluwer Academic Publisher, Boston, 1999, pp. 1-22).*
Dietterich, T.G., "An Experimental Comparison of Three Methods for Constructing Ensembles of Decision Trees: Bagging, Boosting and Randomization," Machine Learning, Kluwer Academic Publishers, Boston, (1999), pp. 1-22.
Miller, B. L., et al., "Optimal Sampling for Genetic Algorithms," ASME, (1996), pp. 1-6.
Cantu-Paz, E., et al., "Using Evolutionary Algorithms to Induce Oblique Decision Trees," Lawrence Livermore National Laboratory, UCRL-JC-137202 Preprint, submitted to Genetic and Evolutionary Computation Conference, Las Vegas, NV, July 8-12, 2000, Jan. 21, 2000, 12 pages.

(Continued)

*Primary Examiner*—Jean M. Corrielus
*Assistant Examiner*—Joon Hwan Hwang
(74) *Attorney, Agent, or Firm*—Eddie E. Scott; Alan H. Thompson

(57) ABSTRACT

A decision tree system that is part of a parallel object-oriented pattern recognition system, which in turn is part of an object oriented data mining system. A decision tree process includes the step of reading the data. If necessary, the data is sorted. A potential split of the data is evaluated according to some criterion. An initial split of the data is determined. The final split of the data is determined using evolutionary algorithms and statistical sampling techniques. The data is split. Multiple decision trees are combined in ensembles.

30 Claims, 5 Drawing Sheets

OTHER PUBLICATIONS

Cantu-Paz, E., et al., "Using Evolutionary Algorithms to Induce Oblique Decision Trees," Lawrence Livermore National Laboratory, accepted for publication in the Genetic and Evolutionary Computation Conference (GECCO-2000), (2002), 8 pages.

* cited by examiner

CREATING ENSEMBLES OF OBLIQUE DECISION TREES WITH EVOLUTIONARY ALGORITHMS AND SAMPLING

The United States Government has rights in this invention pursuant to Contract No. W-7405-ENG-48 between the United States Department of Energy and the University of California for the operation of Lawrence Livermore National Laboratory.

CROSS REFERENCE TO RELATED APPLICATIONS

Related subject matter is disclosed and claimed in the two commonly owned, copending, U.S. Patent Applications; "PARALLEL OBJECT-ORIENTED DECISION TREE SYSTEM," by Chandrika Kamath and Erick Cantu-Paz, U.S. patent application Ser. No. 09/977,570, filed Jun. 8, 2001; "PARALLEL OBJECT-ORIENTED DATA MINING SYSTEM," by Chandrika Kamath and Erick Cantu-Paz, U.S. patent application Ser. No. 09/877,685, filed Jun. 8, 2001. The two commonly owned, copending, U.S. Patent Applications are incorporated herein by reference in their entirety.

BACKGROUND

1. Field of Endeavor

The present invention relates to classification systems and more particularly to decision trees.

2. State of Technology

U.S. Pat. No. 5,787,425 for an object-oriented data mining framework mechanism by Joseph Phillip Bigus, patented Jul. 28, 1998 provides the following description, "The development of the EDVAC computer system of 1948 is often cited as the beginning of the computer era. Since that time, computer systems have evolved into extremely sophisticated devices, capable of storing and processing vast amounts of data. As the amount of data stored on computer systems has increased, the ability to interpret and understand the information implicit in that data has diminished. In the past, data was stored in flat files, then hierarchical and network data based systems, and now in relational or object oriented databases. The primary method for analyzing that data has been to form well structured queries, for example using SQL (Structured Query Language), and then to perform simple aggregations or hypothesis testing against that data. Recently, a new technique called data mining has been developed, which allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information. Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground."

The paper "Using Evolutionary Algorithms to Induce Oblique Decision Trees," by Erick Cantu-Paz and Chandrika Kamath, presented at the Genetic and Evolutionary Computation Conference, Las Vegas, Nev., Jul. 8–12, 2000 indicates that decision trees (DTs) are popular classification methods, and there are numerous algorithms to induce a tree classifier from a given set of data. Most of the tree inducing algorithms create tests at each node that involve a single attribute of the data. These tests are equivalent to hyperplanes that are parallel to one of the axes in the attribute space, and therefore the resulting trees are called axis-parallel. These simple univariate tests are convenient because a domain expert can interpret them easily, but they may result in complicated and inaccurate trees if the data is more suitably partitioned by hyperplanes that are not axis-parallel. Oblique decision trees use multivariate tests that are not necessarily parallel to an axis, and in some domains may result in much smaller and accurate trees. However, these trees are not as popular as the axis-parallel trees because the tests are harder to interpret, and the problem of finding oblique hyperplanes is more difficult than finding axis-parallel partitions, requiring greater computational effort." The paper "Using Evolutionary Algorithms to Induce Oblique Decision Trees," by Erick Cantu-Paz and Chandrika Kamath, presented at the Genetic and Evolutionary Computation Conference, Las Vegas, Nev., Jul. 8–12, 2000 is incorporated herein by this reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a data mining system based on ensembles of oblique decision trees that recognizes patterns among objects in the data based upon features of the data. The decision tree process includes reading the data, determining the best manner to split the data into subsets according to some criterion, and splitting the data. The decision tree system is part of the parallel pattern recognition module, which in turn is part of a data mining system. The decision tree system includes a module to read the data, a module to sample the data, a module to sort the data if sorting is necessary, a module to determine the best manner to split the data into subsets according to some criterion, a module to split the data, and a module to combine multiple decision trees. As part of the pattern recognition module, the decision tree system interacts with the other modules of the object oriented data mining system. These include an object oriented feature extraction module to extract features from the objects in the data, a storage module to store the features, and an object oriented module for linking the modules of the data mining system. The present invention can be implemented on parallel computers.

The present invention uses evolutionary algorithms and statistical sampling techniques to determine the best manner to split the data according to some criterion. Using these evolutionary algorithms and sampling techniques result in different oblique decision trees every time that the tree construction process is invoked on the same data. The present invention invokes the tree construction process multiple times and combines the resulting decision trees into ensembles that will be used to make the final object classifications.

The present invention has an enormous number of uses. It provides a decision tree system for scientific, engineering, business and other data. The system has applications which include, but are not limited to the following: astrophysics, detecting credit card fraud, assuring the safety and reliability of the nation's nuclear weapons, nonproliferation and arms control, climate modeling, the human genome effort, computer network intrusions, reveal consumer buying patterns, recognize faces, recognize eyes, recognize fingerprints, analyze optical characters, analyze the makeup of the universe, analyze atomic interactions, web mining, text mining, multimedia mining, and analyzing data gathered from simulations, experiments, or observations.

Embodiments of the present invention provide scientific researchers with tools for use in plowing through enormous data sets to turn up information that will help them better understand the world around us and assist them in performing a variety of scientific endeavors. Other embodiments of the present invention provide academic and business users with tools for use in plowing through enormous data sets to turn up information that will help them perform a variety of endeavors. The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
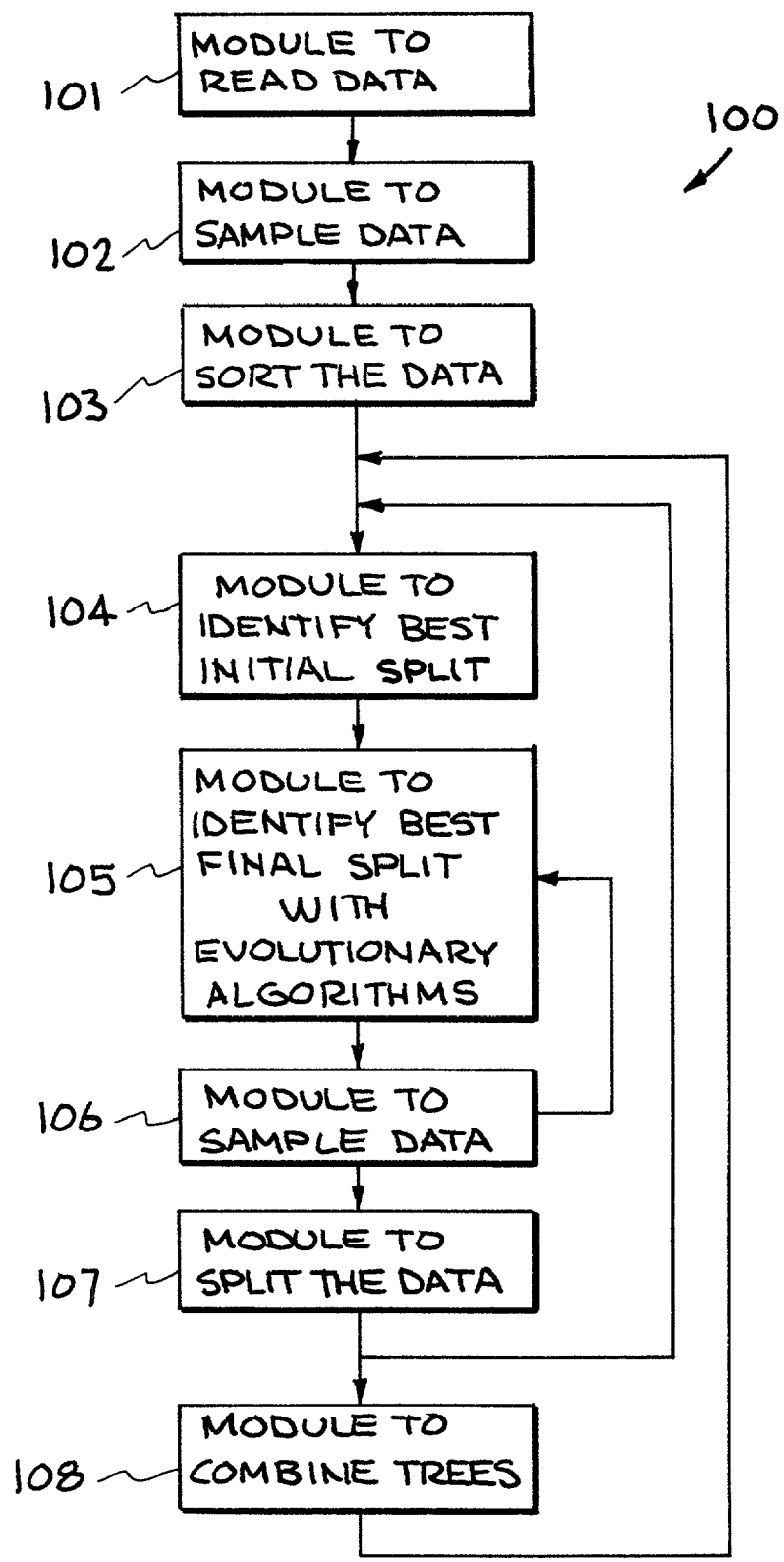
FIG. 1 is a flow chart illustrating decision tree, evolutionary algorithms, and sampling modules used in one embodiment of the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Decision trees (DTs) are popular classification methods, and there are numerous algorithms to induce a tree classifier from a data set. Most tree inducing algorithms create tests at each node that involve a single attribute of the data. These tests are equivalent to hyperplanes that are parallel to one of the axes in the attribute space, and therefore, the resulting trees are called axis-parallel. These simple univariate tests are convenient because a domain expert can interpret them easily, but they may result in complicated and inaccurate trees if the data is more suitably partitioned by hyperplanes that are not axis-parallel. Oblique decision trees use multivariate tests that are not necessarily parallel to an axis, and in some domains may result in much smaller and more accurate trees. However, oblique trees are not as popular as the axis-parallel trees because the tests are harder to interpret, and the oblique inducers require greater computational resources than the axis-parallel algorithms. Evolutionary algorithms (EAs) are stochastic search methods based on the mechanics of natural selection and genetics.

The task of any DT inducer is to use the information contained in a training set of labeled instances to create a model that predicts the class of unseen instances. Consider that the instances take the form (x1, x2, . . . , xd, cj), where the xi are real-valued attributes, d is the number of attributes, and cj is a discrete value that represents the class label of the instance. Most tree inducers consider tests of the form xi>k that are equivalent to axis-parallel hyperplanes in the attribute space. The task of the inducer is to find the best values for i and k. Most tree-building algorithms evaluate the candidate hyperplanes using the impurity of the split defined by the hyperplane. Consider more general tests of the form $$\sum_{i=1}^{d} a_i xi + a_{d+1} > 0 \quad \text{(Equation 1)}$$

where the ai are real-valued coefficients. In this case, the task of the inducer is much harder than before, because it involves searching in a (d+1)-dimensional space. Finding the best oblique tree is an NP-complete problem, and therefore existing oblique DT inducers use a heuristic to find appropriate values for the coefficients of the hyperplane. Existing oblique decision tree algorithms include CART-LC, OC1, and the use of simulated annealing as described in the following paragraphs.

CART-LC: It has been suggested that the use of linear combinations of features to split the data at a node. If the features for a data instance are given as $(x_1, x_2, \ldots, x_n, c)$, where c is the class label associated with the instance, then, Breiman, et al., (1996), "Bagging predictors," Machine Learning, 26(2), pp. 123–140, search for a best split of the form $$\sum_{i=1}^{n} a_i x_i \leq d \text{ where } \sum_{i=1}^{n} a_i^2 = 1$$

and d ranges over all possible values. The solution approach cycles through the variables $x_1, \ldots, x_n$, trying to find the best split on each variable, while keeping the others constant. A backward deletion process is then used to remove variables that contribute little to the effectiveness of the split. This approach is fully deterministic and can get trapped in a local minimum.

OC1: The oblique classifier OC1 attempts to address some of the limitations of the CART-LC approach by including randomization in the algorithm that finds the best hyperplane. Further, multiple random re-starts are used to escape local minima. In order to be at least as powerful as the axis-parallel decision trees, OC1 first finds the best axis-parallel split at a node before looking for an oblique split. The axis-parallel split is used if it is better than the best oblique split determined by the algorithm for that node.

OC1 shifts to an axis-parallel split when the number of examples at a node falls below a user-specified threshold to ensure that the data does not underfit the concept to be learned.

OC1 uses an ad-hoc combination of hillclimbing and randomization. As in CART-LC, the hillclimber finds locally optimal values for one coefficient at a time, although OC1 offers several variants to choose the order in which the coefficients are optimized. The randomization component takes two forms: OC1 uses multiple random restarts, and when hillclimbing reaches a local minimum the hyperplane is perturbed in a random direction. Murthy, et al., (1997), "On growing better decision trees from data," doctoral dissertation, University of Maryland, present OC1 as an extension of CART with linear combinations that overcomes some of its limitations. In particular, Murthy, et al. claim that CART's deterministic nature may cause it to get trapped in local minima, and that using randomization may improve the quality of the DTs. In addition, OC1 produces multiple trees using the same data, and unlike CART, the time used at each node in the tree is bounded. Murthy, et al. present experimental results that suggest that OC1 outperforms CART in several domains.

Heath, et al., (1993), "Induction of oblique decision trees," Proceedings of the 13th International Joint Conference on Artificial Intelligence (pp. 1002–1007), San Mateo, Calif.: Morgan Kaufmann, used simulated annealing (SA) to perturb the hyperplane's coefficients. Simulated annealing is a more sophisticated optimizer than those used in CART and OC1, and in some domains it can produce small and highly accurate trees. However, simulated annealing converges very slowly, and the DT inducer has to examine a large number of hyperplanes, making it inadequate for large data sets. However, It is not necessary to run SA for a long time to find acceptable solutions.

At the heart of all traditional DT inducing algorithms there is an optimization task. In traditional 'top-down' induction of decision trees this task is performed at each node of the tree, then the data is partitioned into subsets, and the algorithm is applied recursively to each subset. Evolutionary algorithms (EAs) will be used to optimize the splitting criteria. EAs are a promising technique to build oblique trees for a number of reasons: (1) More sophisticated optimizers. EAs are not limited to considering one coefficient at a time (unlike CART-LC and OC1), and it is likely that EAs find better splits than the simple greedy hillclimbers that are currently in use. (2) No need for optimal splits. Finding the best split at each node does not guarantee that the best tree will be found. After all, most of the algorithms attempt to optimize a heuristic measure of the impurity of the split. Therefore, there is no need to run the EAs (or any other optimizer, for that matter) until they find the best solution that they can. It is well known that EAs quickly improve on the initial solutions, and so the best hyperplanes found may be used after just a few iterations. (3) Scalability to high dimensional spaces. The dimension of the search space is defined by the number of attributes that describe each instance. In practice this can be a large number, and the execution time of some existing DT algorithms may not scale up well. In contrast, EAs have been shown to have good scalability to the dimensionality of the problem. (4) Use of problem-specific knowledge. There are numerous opportunities to incorporate knowledge about the DT-inducing problem into the EAs. For instance, real-valued encodings and operators seem natural to represent and manipulate hyperplanes. In addition, it is well known that seeding the initial population of the EA with known 'good' solutions can enhance the quality of the search and shorten the execution time. For example, use axis-parallel hyperplanes or oblique solutions based on linear discriminant functions. (5) Hybridization. Most DT algorithms use a local optimizer that is well tuned to the tree induction task, and combining the local optimizer with the EA could boost performance significantly. (6) Tolerance to noise. More efficient EA-based DT inducers may be obtained by approximating the fitness of a hyperplane by using a small random sample of instances to evaluate the split. This approximation would assign different fitness values to the same hyperplane every time that it is evaluated, but EAs are tolerant to such noisy fitness evaluation. (7) Parallel implementations. It is straightforward to implement EAs on parallel computers, and the expected performance improvements are very promising. (8) Amenability to create ensembles. Since EAs are stochastic algorithms, they produce a different tree every time that they are run on the same data set. These trees can be easily combined into ensembles where the classification of an example is determined by the (possibly weighted) vote of all the trees. It is well known that ensembles of classifiers usually have a lower error rate than single classifiers. However, creating ensembles also increases the computation time required to produce a classifier. The invention described here combines evolutionary algorithms and statistical sampling methods in such a way that ensembles are created quickly.

FIG. 1 is a flow chart illustrating modules used in one embodiment of the present invention. This embodiment of the present invention is designated generally by the reference numeral 100. The following modules are included in flow chart: module to read data 101, module to sample data 102, module to identify the best initial split 104, module to identify the best final split 105, module to sample data 106, module to split the data 107, and module to combine multiple decision trees 108. It is to be understood that not all of the modules are used in individual embodiments of the invention. The embodiment 100 can be implemented on parallel computers.

The first module 101 reads the data from a file to main memory. Once the data is read to memory, the sampling module decides whether to sample the data at this point depending on the options used in the modules that decide the best initial and final splits. If sampling at this point is necessary, the sampling module uses simple random sampling to select the data items used in all of the following modules, but other sampling methods are possible. The sorting module decides whether to sort each numeric feature of the data depending on the options used in the next module that decide the best initial split. If sorting is necessary, the sorting module sorts each feature. The module that selects the best initial split decides whether to generate an initial random hyperplane or attempts to find the best axis-parallel split according to a pre-determined splitting evaluation criterion. If an axis-parallel split is necessary, the module that selects the best initial split proposes splits, and uses the sampling module to select data items that are used to evaluate the proposed splits using a splitting evaluation function, and chooses the best split according to the evaluation criterion. The module that selects the best final split uses evolutionary algorithms to propose splits, uses the sampling module to sample data items that are used to evaluate the proposed splits using a splitting evaluation criterion, and chooses the best split according to the evaluation criterion. The module that splits the data uses the best final split found by the previous module to split the data. The modules of finding the best initial split, finding the best final split, and splitting the data are repeated on any unresolved tree nodes. The resulting oblique decision trees are grouped by the module that combines multiple decision trees to create an ensemble.

Figure 2:
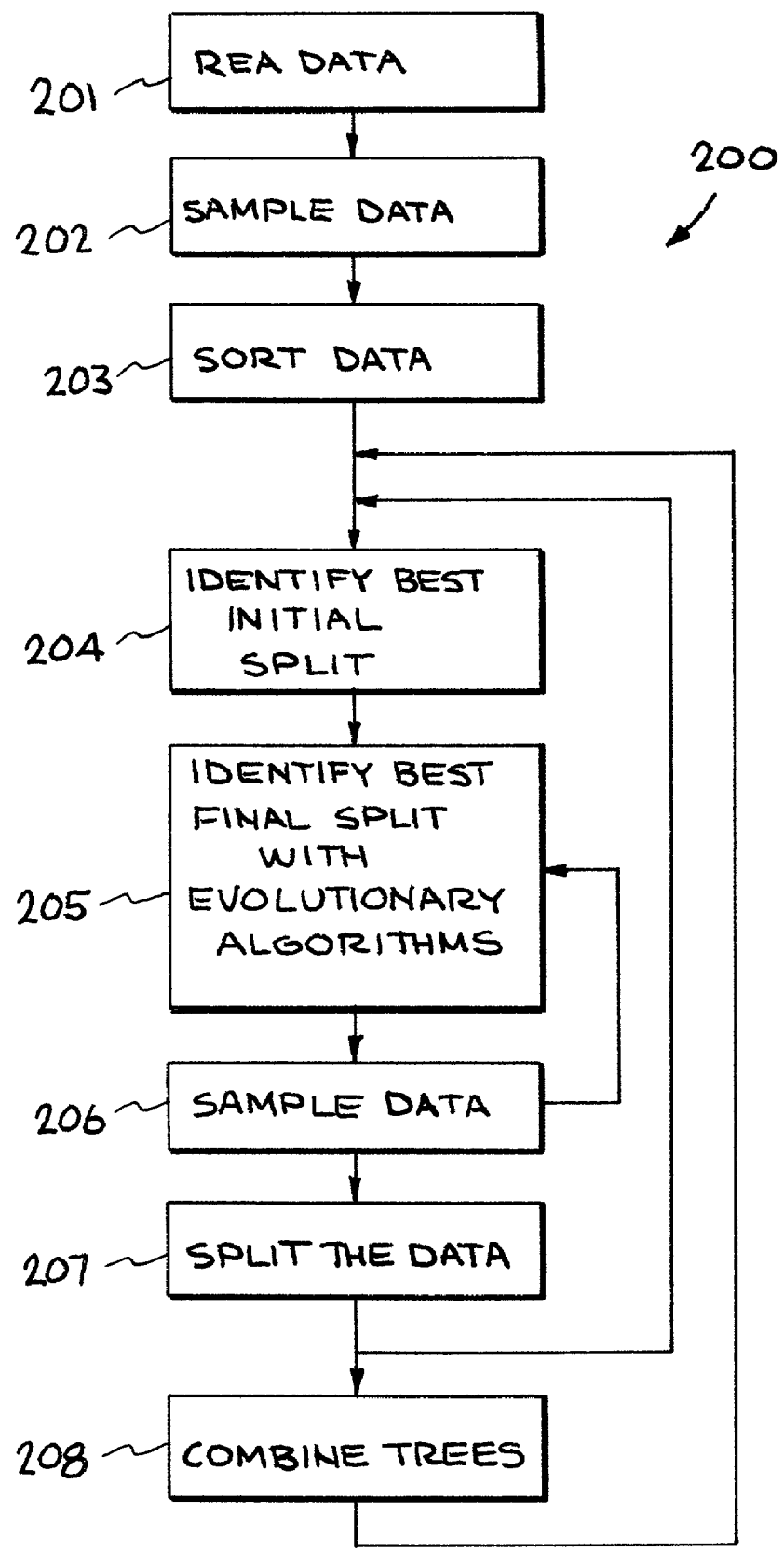
FIG. 2 is a flow chart illustrating decision tree, evolutionary algorithms, and sampling methods used in one embodiment of the present invention.

FIG. 2 is a flow chart illustrating steps used in a method of one embodiment of the present invention. The method is designated generally by the reference numeral 200. The following steps are included in flow chart: step to read data 201, step to sample data 202, step to identify the best initial split 204, step to identify the best final split 205, step to sample the data 206, step to split the data 207, and step to combine multiple decision trees 208. It is to be understood that not all of the steps are used in individual embodiments of the invention. The method 200 can be implemented on parallel computers.

The first step 201 reads the data from a file to main memory. Once the data is read to memory, the sampling step decides whether to sample the data at this point depending on the options used in the steps that decide the best initial and final splits. If sampling at this point is necessary, the sampling step uses simple random sampling to select the data items used in all of the following steps, but other sampling methods are possible. The sorting step decides whether to sort each numeric feature of the data depending on the options used in the next step that decide the best initial split. If sorting is necessary, the sorting step sorts each feature. The step that selects the best initial split decides whether to generate an initial random hyperplane or attempts to find the best axis-parallel split according to a pre-determined splitting evaluation criterion. If an axis-parallel split is necessary, the step that selects the best initial split proposes splits, and uses the sampling step to select data items that are used to evaluate the proposed splits using a splitting evaluation function, and chooses the best split according to the evaluation criterion. The step that selects the best final split uses evolutionary algorithms to propose splits, uses the sampling step to sample data items that are used to evaluate the proposed splits using a splitting evaluation criterion, and chooses the best split according to the evaluation criterion. The step that splits the data uses the best final split found by the previous step to split the data. The steps of finding the best initial split, finding the best final split, and splitting the data are repeated on any unresolved tree nodes. The resulting oblique decision trees are grouped by the step that combines multiple decision trees to create an ensemble.

Experiments—To demonstrate the feasibility of using EAs to search for oblique partitions, four sets of experiments were conducted. In the first set, public-domain data sets from the UCI repository, Blake, et al., (1998), "UCI repository of machine learning databases," were used. Four data sets were included. Next, artificial data with known properties was used, and experiments to study the scalability of the different algorithms to the dimensionality of the domain performed. Larger data sets to illustrate how sampling may help to scale up the evolutionary approach to more realistic situations were also used. Finally, experiments with ensembles and statistical sampling methods were presented. The experimental results with ensembles combine the decisions of the oblique trees using simple majority voting.

The publicly-available source code of OC1 to find oblique partitions using two different EAs and applicants version of simulated annealing was extended. The experiments compare the performance of six algorithms:

1. OC1 limited to axis-parallel tests, which is called OC1-AP.
2. OC1 with its default parameters.
3. CART-LC as implemented by Murthy, et al. (1994) in the OC1 system.
4. OC1-ES, applicants extension to OC1 using evolution strategies.
5. OC1-GA, applicants extension to OC1 using genetic algorithms.
6. OC1-SA, applicants extension to OC1 using simulated annealing.

OC1-ES, the first extension to OC1, uses a (1+1) evolution strategy with self-adaptive mutations. The candidate hyperplane is represented as a vector of real-valued coefficients, a1, . . . , ad+1. The initial hyperplane is the best axis-parallel split found by OC1. For each hyperplane coefficient there is a corresponding mutation coefficient ai, i=1, . . . , d+1, which is initially set to 1. At each iteration, t, the mutation coefficients are updated and a new hyperplane is obtained according to the following rule:

$$v = N(0,1) \qquad \text{(Equation 2)}$$
$$\sigma_i^{t+1} = \sigma_i^t \exp{\tau' V + \tau N(0,1)}$$
$$a_i^{t+1} = a_i^t + \sigma_i^{t+1} N(0,1)$$

where N(0,1) indicates a realization of a unit normal variate, $\tau = 1/mt;epmrl; \sqrt{2rl}; \sqrt{drlxrlxmx}$, and $\tau^1 = 1mt;epmrl; \sqrt{2drlxmx}$. The ES was stopped after 1000 iterations.

The second extension to OC1 uses a simple generational GA with real-valued genes (OC1-GA). For the experiments, the GA used pairwise tournament selection without replacement, uniform crossover with probability 1.0, and no mutation. The population size was set to $20\sqrt{d}$, along the lines of a population-sizing theory that proposes that the population size required to reach a solution of a particular quality is $O(\sqrt{d})$ (Harik, et al., 1999). The best axis-parallel hyperplane was copied to 10% of the initial population, and the remainder of the population was initialized randomly with coefficients ai C [-200, 200]. The GA was stopped after 25 generations.

The simulated annealing algorithm (OC1-SA) is different from the one that Heath, Kasif, and Salzberg (1993) used. Their algorithm modified only one coefficient at a time and they let the algorithm run for a large number of iterations to try to reach a global optimum. Since preliminary studies had success with evolutionary algorithms that may change all the coefficients simultaneously, a simple SA algorithm with the same characteristic was used.

The SA begins with a temperature of 1, and the initial hyperplane is the best axis-parallel solution found by OC1. The inner loop of the algorithm consists on perturbing the hyperplane by adding independent unit normal variates to each of the coefficients. The new hyperplane is evaluated and accepted as the current solution if it is better than the previous one or if it is worse with a probability exp $(-b/T)$, where b is the difference between the qualities of the hyperplane before and after it was perturbed and T is the temperature. This inner loop is repeated for 50d iterations or until 10d hyperplanes are accepted. The temperature is then reduced by half and the process is repeated 20 times.

The same parameters for all the data sets were used. The parameters were calibrated with a few runs using two data sets (Diabetes and LS10, which will be described later) that were chosen mainly because they are not too large, and because one of them (LS-10) is completely separable by oblique hyperplanes. Not much time was spent adjusting the parameters of the algorithms, and it is probable that higher accuracies or smaller trees in shorter times could be used by tuning the parameters to each data set. Note, however, that in contrast with OC1 and CART-LC, the algorithms introduced (OC1-SA, OC1-GA, and OC1-ES) consider the dimensionality of the problem to set their control parameters or to generate new candidate solutions.

The execution times were measured on a 500 MHz Pentium III PC with 128 Mb of RAM running NT 4.0. The programs were compiled with the ecgs compiler version 2.91 using —O optimizations. All experiments measure the impurity of a split at each tree node using the twoing rule, which is the default in OC1:

$$\text{impurity} = \frac{N_L}{N} \frac{N_R}{N} \left( \sum_{NL}^{Li} \frac{L_i}{N_L} - \frac{R_i}{N_R} \right)^2 \quad \text{(Equation 3)}$$

where NL and NR are the number of examples on the left and right of split; N is the total number of examples under consideration at a node; Li and Ri are the number of examples of category i on the left and right of the split. For the evolutionary algorithms, the impurity was used without modification as the fitness of the hyperplanes.

TABLE 1

Descriptions of the small public domain data sets used in the experiments.

| Name | Task Description | Attributes | No. of Instances |
|---|---|---|---|
| Cancer | Diagnose a tumor as benign or malignant | 9 | 683 |
| Diabetes | Detect presence of diabetes | 8 | 768 |
| Glass | Identify type of glass | 10 | 214 |
| Housing | Predict housing values in suburbs of Boston | 12 | 506 |
| Iris | Classify type of iris | 4 | 150 |
| Vehicle | Identify vehicle silhouettes | 18 | 846 |
| Vowel | Identify spoken vowels | 10 | 990 |

Small Data Sets—The first round of experiments used small public domain data sets, which are available at the UCI machine learning repository. The data sets are briefly described in Table 1 (shown above) and have been used in numerous studies of machine learning and data mining algorithms. For comparison, an experimental procedure was used to compare OC1 to other DT inducers: the standard parameters of OC1 were used, and the results presented are the average of ten five-fold cross-validation experiments. The percentage of instances classified correctly, the size of the tree measured by the number of leaves, and the execution time of the program measured in seconds, along with 95% confidence intervals for each result were reported.

For most data sets, the differences in the accuracy of the algorithms was small, although in most cases the AP trees were significantly less accurate than the best trees. For six data sets, OC1-SA and OC1-ES found trees that are the most accurate or statistically indistinguishable from the most accurate, followed by OC1 and OC1-GA with five top trees each. In terms of tree size, OC1 found most of the smallest trees. The average size of the trees found by the GA and ES-augmented inducers was close to the axis-parallel algorithm. The most noticeable differences were in execution times: the EAs were on average approximately 3 times faster than OC1 and about 5 times faster than OC1-SA, but much slower than OC1-AP and CART-LC. On average, CART-LC was the fastest oblique tree algorithm on these data sets, but it found top-performing trees less often than the other oblique algorithms.

Results on Cancer, Iris, Housing, and Diabetes are similar to those obtained by Murthy, et al. in 1994. The differences are not significant and may be due to the difference in hardware, operating system, or compiler between applicants study and theirs. Using simulated annealing, accuracies of 94.9%, and 94.7% on the Cancer and Iris data sets, respectively, while applicants OC1-SA found trees with accuracies of 93.5% and 96.3%. This version of SA is faster because it evaluates far fewer hyperplanes per node, but precise comparisons can not be made since Murthy, et al., did not report execution times (and applicants hardware is probably very different from theirs).

Artificial Data—The next set of experiments used three artificial data sets. The purpose of these experiments is to ensure that the target concept matches the bias of the algorithms—the classes are separable by oblique hyperplanes, so the AP trees were expected to perform poorly on these data sets. In addition, experiments to explore the scalability of the algorithms were performed as the number of attributes was varied. Similar data sets were also used by Murthy, et al. in 1994 in their evaluation of OC1, but these data sets were used to study different properties of the algorithms.

The first artificial data set has 2000 instances divided into two classes. Each instance has d attributes whose values are uniformly distributed in [0,1]. The data is separable by the hyperplane $x1+ \ldots +x_{d/2+1} < x_{d/2+1} + \ldots +xd$, where d is one of 10, 20, 50, 100. These data sets are labeled LS10, LS20, LS50, and LS100 according to their dimensionality.

cantly different (with 95% confidence) from the most accurate. In this case, OC1-AP consistently found the least accurate and largest trees. As expected, OC1-AP was the fastest algorithm, but its accuracy was too low to consider AP trees competitive (consider that random guessing would result in a 50% accuracy and the accuracy of OC1-AP on LS100 is 56%). OC1-SA produced accurate and very small trees for LS10 and LS20, but in higher dimensions its performance dropped below the EA-augmented inducers, and it took the longest time at dimensions higher than 20. Murthy, et al. in 1994 reported that Heath's 1993 SA algorithm is 95.2% accurate on LS10. OC1-GA performed well at low dimensions and became the top-performing algorithm at high dimensions. However, its execution time increased faster than OC1-ES, which appears to scale well to the increase in dimensionality, although it never found a top-performing tree. The size of the trees found by OC1 and CART-LC increases with the number of dimensions, but those of OC1-GA, OC1-ES, and OC1-SA remained relatively small. However, consider that the ideal tree for this domain has two leaves and all the algorithms found much larger trees (except for OC1-SA on LS10 and LS20).

The second and third artificial data sets, POL2 and RCB2, represent concepts that are supposed to be more difficult to learn than the LS problems. POL2 and RCB2 are defined in 2 dimensions (x1, x2 E [0,1]). The concept represented by the POL2 data is a set of parallel oblique lines (hence its name), it contains 2000 instances divided into two classes.

TABLE 2

Comparison of different algorithms on the LS artificial data sets.

| Dim. | | OC1-AP | OC1 | CART-LC | OC1-SA | OC1-GA | OC1-ES |
|---|---|---|---|---|---|---|---|
| 10 | Accuracy | 73.0 ± 0.9 | 97.1 ± 0.2 | 96.0 ± 0.9 | 99.4 ± 0.1 | 95.4 ± 0.4 | 93.7 ± 0.5 |
|  | Leaves | 86 7 ± 9.7 | 5.3 ± 1.3 | 5.9 ± 2.1 | 2.0 ± 0 | 8.8 ± 2.3 | 9.9 ± 1.6 |
|  | Time | 1.6 ± 0.0 | 170.9 ± 7.0 | 16.8 ± 0.7 | 28.0 ± 1.9 | 36.3 ± 2.3 | 29.8 ± 1.1 |
| 20 | Accuracy | 64.4 ± 0.5 | 88.5 ± 0.7 | 87.3 ± 1.1 | 96.3 ± 0.9 | 92.0 ± 0.4 | 87.0 ± 0.6 |
|  | Leaves | 71.5 ± 17.0 | 5.9 ± 1.6 | 9.3 ± 2.1 | 3.3 ± 0.8 | 9.8 ± 3.5 | 14.4 ± 3.3 |
|  | Time | 3.5 ± 0 1 | 391.5 ± 9.8 | 54.9 ± 21 | 154.7 ± 15.1 | 101.5 ± 2.8 | 65.1 ± 2.0 |
| 50 | Accuracy | 58.6 ± 0.6 | 72.5 ± 0.8 | 66.3 ± 0.6 | 79.8 ± 1.3 | 85.2 ± 0.6 | 78.5 ± 0.9 |
|  | Leaves | 58.0 ± 12.2 | 10.0 ± 2.1 | 25.0 ± 10.4 | 15.6 ± 2.9 | 9.5 ± 3.3 | 16.3 ± 5.5 |
|  | Time | 11.7 ± 0.3 | 608.7 ± 19.3 | 113.9 ± 2.1 | 1278.6 ± 51.2 | 333.3 ± 13.0 | 163.9 ± 8.7 |
| 100 | Accuracy | 56.1 ± 0.5 | 61.8 ± 0.6 | 58.5 ± 0.7 | 70.6 ± 0.7 | 75.9 ± 0.6 | 70.1 ± 0.9 |
|  | Leaves | 37.7 ± 9.1 | 28.5 ± 7.4 | 36.2 ± 12.3 | 17.6 ± 4.8 | 13.9 ± 3.8 | 13.8 ± 2.8 |
|  | Time | 30.9 ± 0.3 | 802.6 ± 12.2 | 156.3 ± 6.7 | 5020.4 ± 187.9 | 900.1 ± 7.9 | 296.9 ± 17.4 |

The same experimental procedure was followed as in the previous experiments, and the results are summarized in Table 2 (shown above). In the table, the results highlighted in bold are the most accurate and those that are not signifi- The "rotated checker board" (RCB2) data also has 2000 instances, but in this case they are divided into eight classes. The same experimental setup was used as before, and the results are summarized in Table 3 (shown blow).

TABLE 3

Comparison of different algorithms on the 2D artificial data sets.

| Data set | | OC1-AP | OC1 | CART-LC | OC1-SA | OC1-GA | OC1-ES |
|---|---|---|---|---|---|---|---|
| POL2 | Accuracy | 94.2 ± 0.3 | 99.6 ± 0.07 | 97.6 ± 0.3 | 99.0 ± 0.2 | 95.2 ± 0.2 | 94.2 ± 0.4 |
| | Leaves | 77.7 ± 6.1 | 5.0 ± 0 | 14.4 ± 1.7 | 10.3 ± 1.5 | 57.5 ± 6.1 | 6.3 ± 0.6 |
| | Time | 0.3 ± 0.01 | 36 ± 1.3 | 27 ± 0.1 | 8.1 ± 0.5 | 4.7 ± 0.2 | 4.5 ± 0.2 |
| RCB2 | Accuracy | 92.8 ± 0.2 | 99.0 ± 0.07 | 94.4 ± 0.2 | 97.9 ± 0.2 | 93.8 ± 0.4 | 98.1 ± 0.2 |
| | Leaves | 85.7 ± 4 | 8.4 ± 0.2 | 50.6 ± 4.2 | 17.5 ± 2.4 | 64.6 ± 5.7 | 10.9 ± 1.1 |
| | Time | 0.4 ± 0.01 | 44.8 ± 0.9 | 3.4 ± 0.1 | 10.0 ± 0.3 | 5.0 ± 0.1 | 6.0 ± 0.2 |

In these two domains, OC1 produced the most accurate and smallest trees. The smallest trees for POL2 and RCB2 have five and eight leaves, respectively, and OC1 consistently found trees of those sizes. As expected, the axis-parallel trees are the largest and least accurate, but OC1-GA found only slightly more accurate and smaller trees. The fastest oblique DT algorithm was CART-LC, but its accuracy is lower than OC1 and OC1-ES. Both of the EA inducers were approximately eight times faster than OC1, but in these two problems the overall performance of OC1-ES was much better than OC1-GA.

Murthy, Kasif, and Salzberg in 1994 reported that LMDT and Heath's 1993 SA algorithm obtained accuracies of 89.6 and 99.3% in POL2 and 95.7 and 97.9% on RCB2.

Larger Data Sets and Sampling—To study the problem of scalability to larger data sets, three larger data sets were used, which are also available at the UCI ML repository. With these data sets, a more realistic application of EAs to the problem of oblique DT induction was used. The larger size of the training set could cause fitness evaluations to be prohibitively expensive, and therefore faster approximate evaluations were obtained by sampling the training set.

There were two ways of sampling. The first is a preprocessing step in which the training set is sampled once at the beginning of an experiment. This static sampling ignores all the instances that were not selected originally, possibly wasting valuable information. However, static sampling is valuable because it simulates a situation when not much data is available for training, which is often the case in many scientific domains. The second way of sampling is to choose a fraction of the training instances each time a hyperplane is evaluated. This dynamic sampling method is slightly more expensive than sampling statically once per experiment, but it may be advantageous especially when samples are small, because numerous hyperplanes are evaluated in every tree node and the sampling will eventually consider all the available labeled instances.

Evaluating the hyperplanes with dynamic samples also means that every time a particular hyperplane is evaluated, its fitness estimate is different. Repeated evaluations of the same hyperplane would enable us to better estimate its true fitness (e.g., by taking the average of multiple evaluations), and some recent theory could be used to determine the optimal number of repetitive evaluations that would minimize the execution time of the GA. As a first cut, however, a single evaluation was used as a crude—but fast—estimate of fitness.

The experiments used two handwritten digit recognition data sets. The objective is to identify the instances as one of 10 digits. The first data set is the optical digit recognition data set, which has 3823 instances in a training set and 1797 in a test set; each instance is described by 64 numeric attributes. The second data set is the pen-based set that has 7494 training cases and 3498 testing cases; each instance is described by 16 numeric attributes.

The average of 10 experiments were reported, with training and testing using the partition of the instances as in the UCI repository. The algorithms used the same parameters as before. As expected, sampling decreased the execution time as desired, but it also affected the accuracy. For all the sample sizes, OC1-GA found the smallest and most accurate classifiers, and in most cases it was faster than the original oblique OC1. OC1-ES was the fastest of the oblique classifiers, and in most cases its accuracy was better than OC1, CART-LC and OC1-SA, but not as good as OC1-GA. Note, however, that the axis parallel OC1 was the fastest algorithm, and that its accuracy was similar to OC1-ES. In fact, using OC1-AP with the entire data set was faster and more accurate than OC1-GA on 10% samples, so if the end user does not care about the relatively small differences in accuracy, axis-parallel DTs would be a good choice in this domain.

In separate experiments dynamic sampling gave more accurate results than sampling statically at the beginning of the experiments. For static samples of 25% or more of the training set, the accuracy was only slightly lower than with dynamic sampling (approximately 4–5%), but for smaller static samples, the accuracy was between 6 to 22% lower. The general trends were the same as with repetitive sampling, so those results were omitted. Again, OC1-GA found top trees in all of the sample sizes. OC1-ES also performed well finding top trees in four cases and in less time than all the other oblique algorithms.

Finally, experiments were performed with ensembles that combine multiple decision trees. The experiments used the optical and pen digit recognition data sets that were used earlier. Several sets of experiments were performed with each data set. First all the data available was used to build the individual trees, expecting that this would produce the most accurate ensembles. However, since the cost of building the ensemble is a multiple of the cost of building individual classifiers, this option would be the most expensive. Since the last section showed that sampling can reduce the execution time, ensembles were also built by sampling at each node of the tree. Sampling is an additional source of randomization that permits us to build ensembles using the deterministic axis-parallel and CART-LC algorithms.

TABLE 4

Results using ensembles of ten trees on the optical digit recognition data.
The first line is the accuracy and the second is the time.

| % Sample | | OC1-AP | OC1 | CART-LC | OC1-SA | OC1-GA | OC1-ES |
|---|---|---|---|---|---|---|---|
| 5 | Accuracy | 86.6 ± 0.6 | 59.9 ± 2.3 | 38.6 ± 1.8 | 87.9 ± 0.6 | 89.6 ± 0.5 | 89.5 ± 0.3 |
|   | Time | 7.7 ± 0.6 | 78.5 ± 1.5 | 7.9 ± 0.7 | 1766.5 ± 10.2 | 83.0 ± 1.7 | 55.2 ± 1.5 |
| 10 | Accuracy | 88.6 ± 0.4 | 76.2 ± 1.2 | 63.2 ± 2.1 | 90.8 ± 0.2 | 92.3 ± 0.4 | 91.6 ± 0.6 |
|   | Time | 8.7 ± 0.6 | 154.2 ± 4.9 | 11.1 ± 0.8 | 3125.0 ± 15.0 | 151.7 ± 2.8 | 78.5 ± 1.9 |
| 100 | Accuracy | 84.5 ± 1.1 | 93.9 ± 0.2 | 91.1 ± 0.6 | 95.8 ± 0.3 | 95.6 ± 0.2 | 94.9 ± 0.3 |
|   | Time | 50.6 ± 1.1 | 2806.6 ± 21.3 | 708.0 ± 34.3 | 13101 ± 108 | 2272.4 ± 23.5 | 622.1 ± 7.7 |

TABLE 5

Results using ensembles of ten trees on the pen digit recognition data.
The first line is the accuracy and the second is the time.

| % Sample | | OC1-AP | OC1 | CART-LC | OC1-SA | OC1-GA | OC1-ES |
|---|---|---|---|---|---|---|---|
| 5 | Accuracy | 79.9 ± 0.5 | 66.1 ± 1.8 | 50.2 ± 3.4 | 80.0 ± 0.3 | 80.4 ± 0.5 | 81.0 ± 0.6 |
|   | Time | 5.1 ± 0.2 | 79.2 ± 2.1 | 59.5 ± 0.9 | 290.1 ± 1.9 | 54.3 ± 0.8 | 26.9 ± 0.7 |
| 10 | Accuracy | 81.0 ± 0.3 | 74.6 ± 0.5 | 62.0 ± 3.1 | 84.1 ± 0.3 | 83.5 ± 0.4 | 84.2 ± 0.2 |
|   | Time | 6.5 ± 0.5 | 188.5 ± 3.3 | 90.3 ± 1.2 | 567.9 ± 3.8 | 101.8 ± 1.5 | 46.7 ± 1.1 |
| 100 | Accuracy | 81.1 ± 0.6 | 86.8 ± 0.1 | 82.8 ± 0.4 | 87.4 ± 0.1 | 87.1 ± 0.1 | 87.3 ± 0.1 |
|   | Time | 17.1 ± 0.4 | 3677.8 ± 34.8 | 403.1 ± 20.2 | 2921.0 ± 35.5 | 796.4 ± 9.1 | 367.0 ± 3.6 |

The experiments consider ensembles of ten trees, the algorithms used the same parameters, and the training and testing sets were the same as in previous sections. The OCI code was easily modified to handle ensembles. The results presented in Tables 4 and 5 (shown above) are the average of ten trials with each configuration. Note that when all the data was used, the deterministic algorithms produced ensembles of ten identical trees that have exactly the same performance as the individual trees, but those results are included here to facilitate comparisons.

As expected, the ensembles created with all the data have better accuracy than the individual classifiers. Perhaps it is more interesting to note that some of the ensembles created by sampling also had higher accuracy than the most accurate individual trees, and that sometimes the ensembles were created in shorter time. For example, on the optical digit data, building an ensemble with OC1-ES and sampling at 10% gave a higher accuracy (91.6%) than any single classifier built from the entire data, and that it was faster to build the ensemble than the most accurate single tree. Actually, the ensembles generated by OC1-GA and OC1-ES on 5% samples were more accurate (89.6% and 89.5%, respectively) and faster to generate (83 and 55.2 seconds) than single trees found by the existing OC1 and CART-LC algorithms on the entire data (86.4% and 88.2%; 298 and 77 seconds). The results with the pen-based data are not as impressive, but still the ensembles created by ES with 10% samples outperform the single trees found by OCI and CART-LC. As in the previous section, the degradation in accuracy as the sample fraction is reduced is smaller for OC1-SA, OC1-GA, and OCl-ES than for OM and CART-LC.

In summary, traditional DT inducers use some form of heuristic greedy search to find appropriate splits. The greedy search with two evolutionary algorithms was used: a (1+1) evolution strategy and a simple GA. Public domain and artificial data sets with different characteristics were used to evaluate the performance of the EA-based tree inducers, and the results were compared against an axis-parallel and three other oblique algorithms. The use of sampling to further reduce the execution time of the inducers was evaluated. As expected, sampling resulted in faster training times, but also in a loss of accuracy, which was more pronounced in the existing oblique algorithms. In addition, new methods were introduced to generate ensembles of trees based on sampling and evolutionary algorithms.

The results suggest that in many cases, the EAs are capable of finding oblique trees with similar or higher accuracy than existing algorithms, and that this can be done at a competitive cost. The experiments also suggest that the EAs scale up better than traditional methods to the dimensionality of the data. The evolutionary trees seem to perform better than existing methods when they use samples of the training set. This is important because these algorithms can be used confidently on large data sets where small samples may be required to reach a solution quickly. In addition, creating ensembles with the evolutionary algorithms results in higher accuracy than single trees produced by existing methods, and in some cases the cost of generating the ensemble may be lower than generating a simple tree of similar accuracy if sampling is used.

Figure 3:
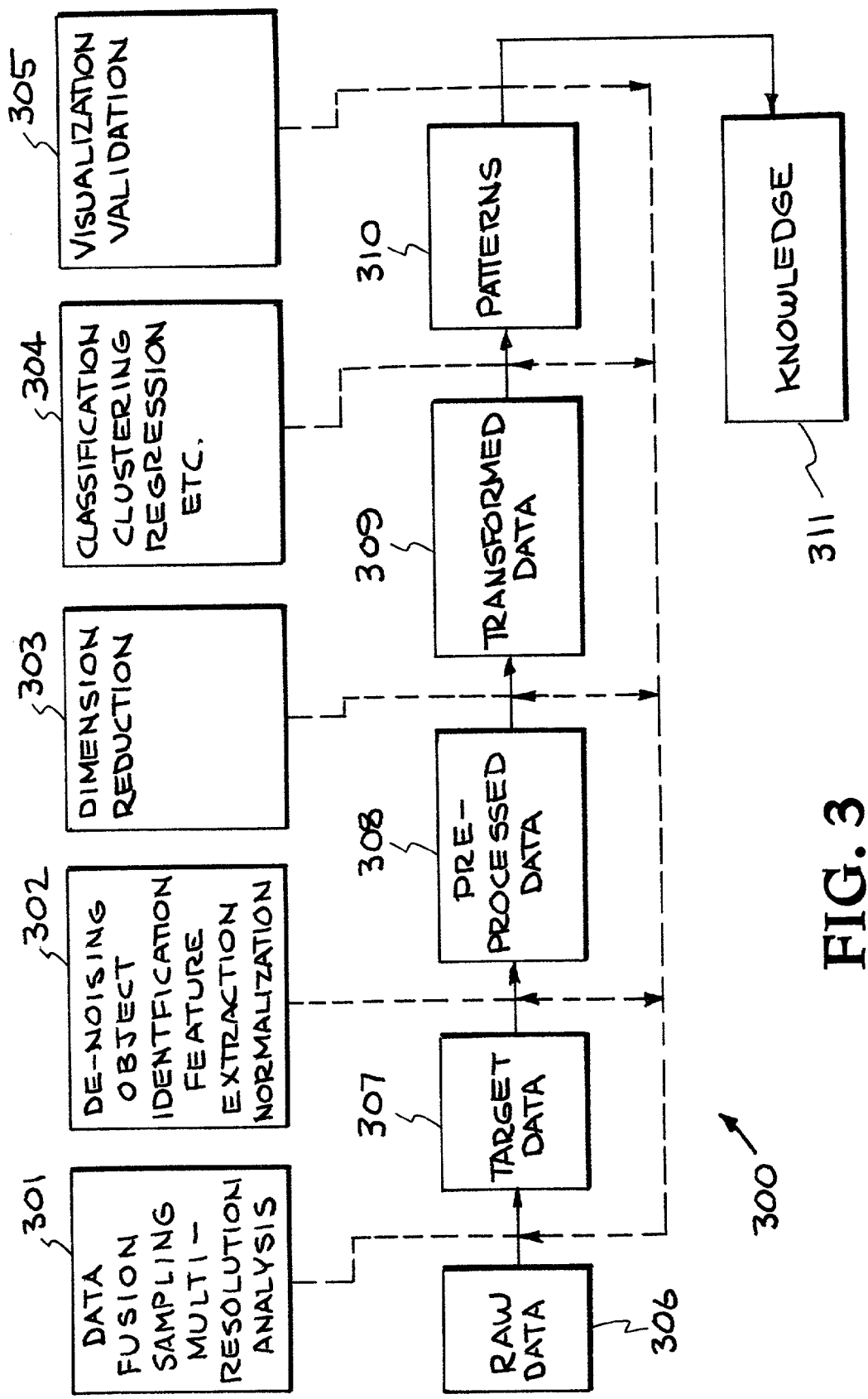
FIG. 3 is a flow chart illustrating that the data mining process is iterative and interactive.

Referring now to FIG. 3, a data mining system incorporating an embodiment of the present invention is illustrated. The data mining system is designated generally by the reference numeral 300. Data mining starts with the raw data 306 and includes extensive pre-processing as illustrated in FIG. 3. If the raw data 306 is very large, the system 300 may use sampling and work with fewer instances, or use multi-resolution techniques and work with data at a coarser resolution. This first step 301 may also include data fusion, if required. Next, noise is removed 302, objects are identified, and relevant features for each object are extracted from the data. At the end of this step, a feature vector is created for each data instance. Depending on the problem and the data, the number of features may need to be reduced using dimension reduction techniques such as principal component analysis (PCA) or its non-linear versions. After this pre-processing, the data 308 is ready for the detection of patterns. These patterns are then displayed to the user, who validates them appropriately.

As shown in FIG. 3, the data mining process is iterative and interactive; any step may lead to a refinement of the previous steps. User feedback plays a critical role in the success of data mining in all stages, starting from the initial description of the data, the identification of potentially relevant features and the training set (where necessary), and the validation of the results.

The development of the data mining system incorporating an embodiment of the present invention required consideration of the design of the system. In order to implement the data mining process in a parallel setting as illustrated in FIG. 3, some considerable thought was given to the system's design. Applicants' experience has shown that a good design should take into account the following: (1) Not all problems require the entire data mining process, so each of the steps should be modular and capable of stand-alone operation. (2) Not all algorithms are suitable for a problem, so the software should include several algorithms for each task, and allow easy plug and play of these algorithms. (3) Each algorithm typically depends on several parameters, so the software should allow user friendly access to these parameters. (4) Intermediate data should be stored appropriately to support refinement of the data mining process. (5) The domain dependent and independent parts should be clearly identified to allow maximum re-use of software as we move from one application to another.

Figure 4:
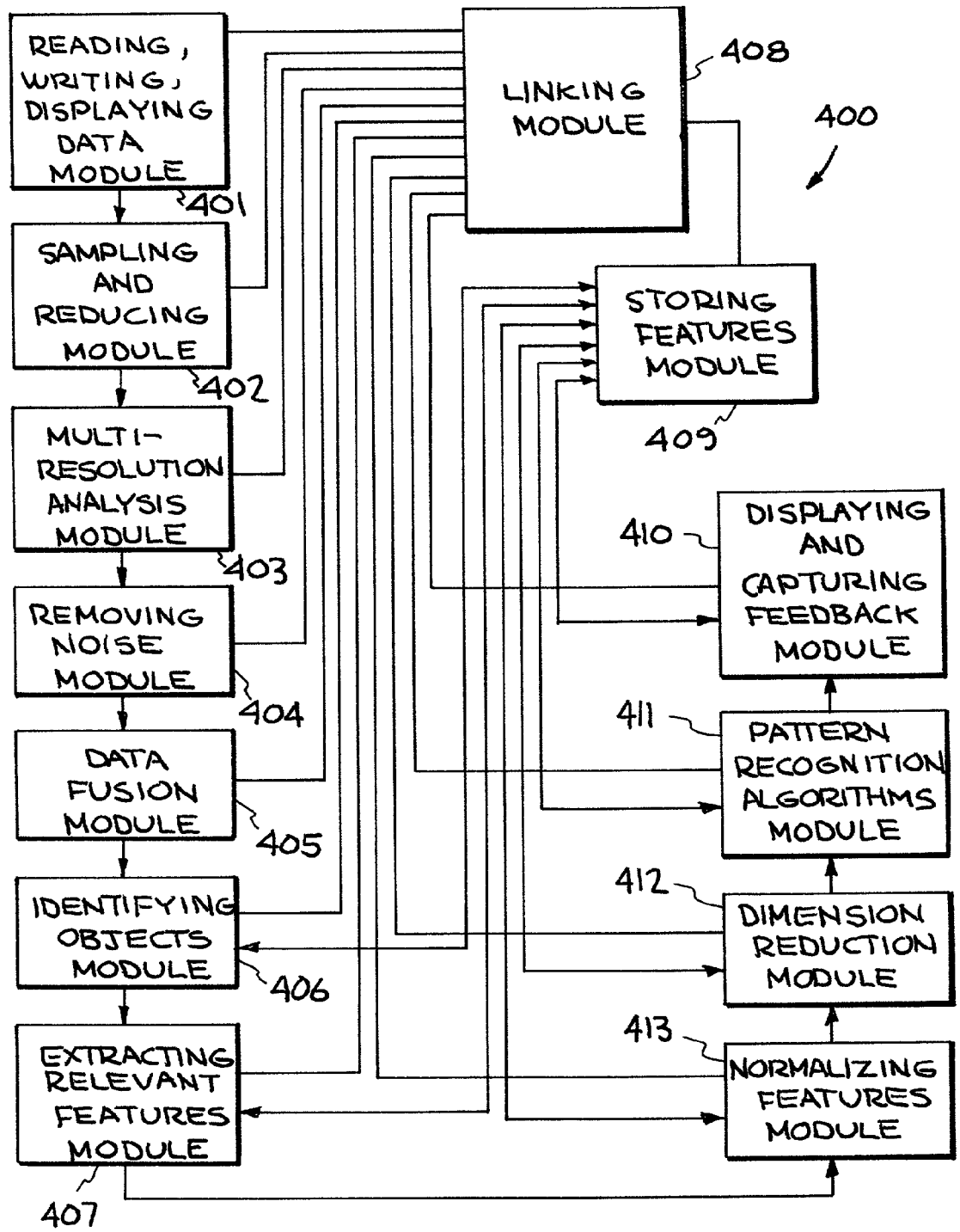
FIG. 4 is a flow chart showing basic modules of a data mining system that incorporates an embodiment of the present invention.

FIG. 4 is a flow chart showing the basic modules of a data mining system incorporating an embodiment of the present invention. The flow chart is designated generally by the reference numeral 400. The individual modules of the flowchart 400 include the following (It is to be understood that not all of the modules are used in individual embodiments of the invention): parallel object-oriented module for reading, writing, displaying data files 401; parallel object-oriented module for sampling said data files to reduce the size of said data files 402; parallel object-oriented module for multi-resolution analysis to perform a reversible transformation into a coarser resolution of said data files 403; parallel object-oriented module for removing noise from said data files 404; parallel object-oriented module for data fusion of said data files 405; parallel object-oriented module for identifying objects in the said data files 406; parallel object-oriented module for extracting relevant features for each of said objects 407; parallel object oriented module for normalizing said features 413; parallel object-oriented module for dimension reduction (reducing the number of said features of said objects) 412; parallel object-oriented module for pattern recognition algorithms 411; parallel object-oriented module for displaying said data files and said objects and capturing feedback from scientists for validation 410; storing features module for storing the features for each of said objects, after they have been extracted in module 407, reduced in number in module 412, used for pattern recognition in module 411, and displayed in module 409; and module for linking the parts of the data mining system 408.

Figure 5:
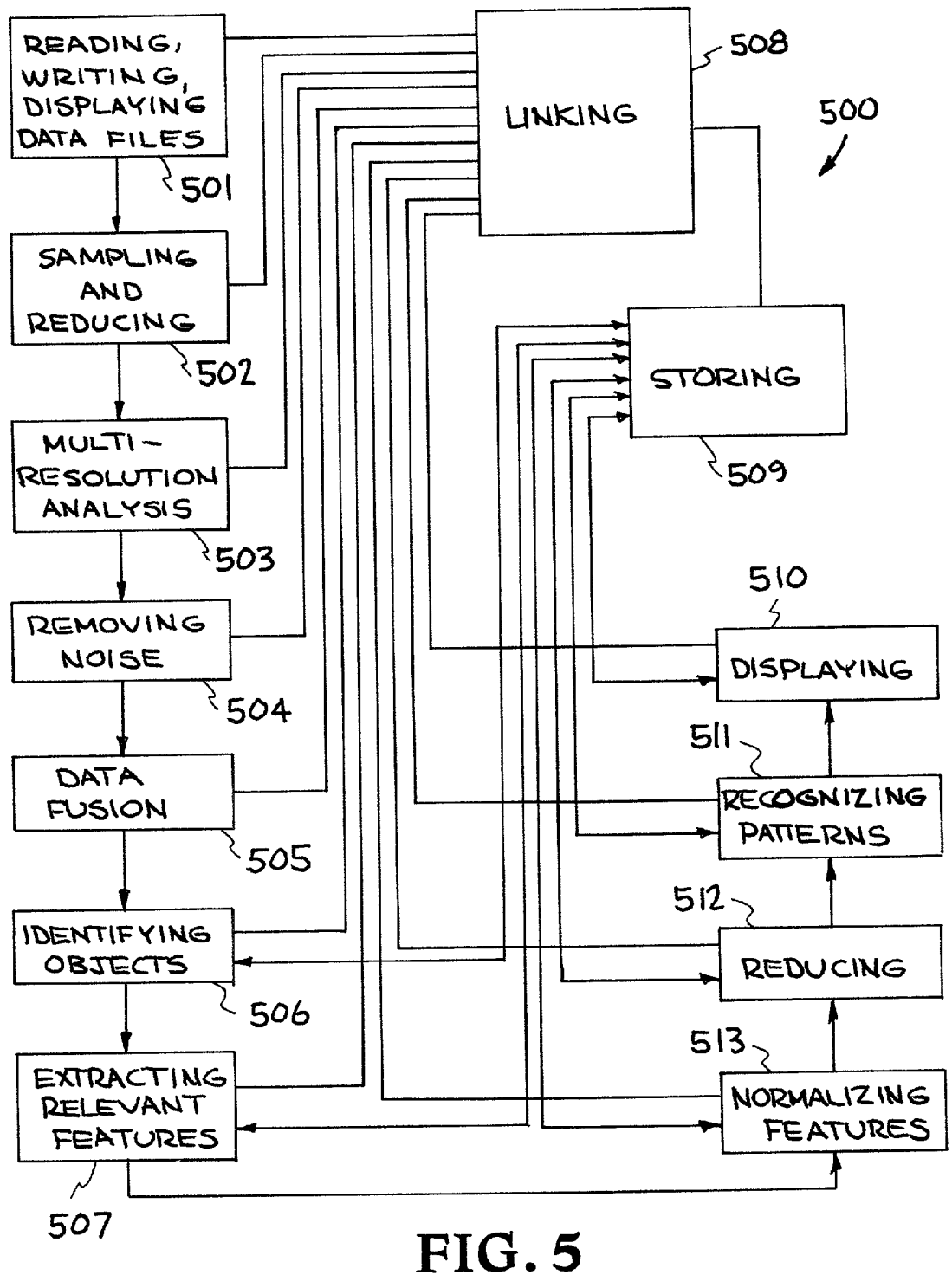
FIG. 5 is a flow chart showing basic steps of a data mining system that incorporates an embodiment of the present invention.

FIG. 5 is a flow chart showing the basic steps of a data mining method that incorporates an embodiment of the decision tree method of the present invention. The flow chart is designated generally by the reference numeral 500. The steps shown in flowchart 500 include the following: reading, writing, displaying data files step 501; sampling said data files and reducing the number of said data files step 502; multi-resolution analysis to perform a reversible transformation into a coarser resolution of said data files step 503; removing noise from said data files step 504; data fusion of said data files step 505; identifying objects in the said data files step 506; extracting relevant features for each of said objects step 507; normalizing the said features of the said objects step 513; reducing the dimension or number of said features of said objects step 512; recognizing patterns among said objects using said features step 511; displaying said data files and said objects and capturing feedback from scientists for validation step 510; storing the said features for each of said objects, after they have been extracted in the object step 507, the reduced in number step, the used for pattern recognition step 511, and the displayed step 509; and the linking the parts of the data mining system step 508.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A computer implemented oblique decision tree induction method for processing data based on evolutionary algorithms and statistical sampling techniques, comprising the steps of:
    reading the data;
    sampling the data;
    sorting the data;
    creating multiple decision trees by the following steps:
    evaluating a potential split of the data according to Gini index, information gain, information ratio, or Twoing rule;
    determining an initial split of the data;
    determining a final split of the data using evolutionary algorithms and statistical sampling techniques;
    splitting the data; and
    combining said multiple decision trees in ensembles, wherein said step of determining the final split of the data using evolutionary algorithms and statistical sampling techniques is based on tests of linear combinations of attributes of the data obtained using evolutionary algorithms and statistical sampling techniques.

2. The computer implemented oblique decision tree induction method of claim 1, wherein said step of evaluating a potential split of the data utilizes Gini index only.

3. The computer implemented oblique decision tree induction method of claim 1, wherein said step of evaluating a potential split of the data utilizes information gain only.

4. The computer implemented oblique decision tree induction method of claim 1, wherein said step of evaluating a potential split of the data utilizes information ratio only.

5. The computer implemented oblique decision tree induction method of claim 1, wherein said step of evaluating a potential split of the data utilizes Twoing rule only.

6. The computer implemented oblique decision tree induction method of claim 1, wherein said step of determining the initial split of the data is based on tests on single attributes of the data or on random multivariate tests.

7. The computer implemented oblique decision tree induction method of claim 1, wherein said statistical sampling techniques are applied once at the beginning of an experiment or every time that a potential split is evaluated.

8. The computer implemented oblique decision tree induction method of claim 7, wherein said statistical sampling techniques include simple random sampling, where every data item has an equal probability of being selected, but other techniques are possible such as stratified sampling preserving the proportion of items of each class in the original data.

9. The computer implemented oblique decision tree induction method of claim 1, wherein said step of combining multiple decision trees in ensembles is based on plurality (usually called majority) voting.

10. The oblique decision tree induction method of claim 1, wherein said step of combining multiple decision trees in ensembles is based on other combination techniques based on assigning different weights to each tree based on their accuracy or other criteria.

11. An oblique decision tree induction computer system for processing data based on evolutionary algorithms and statistical sampling techniques, comprising:
   means for reading the data;
   means for sampling the data;
   means for sorting the data;
   means for creating multiple decision trees using the following:
   means for evaluating a potential split of the data according to Gini index, information gain, information ratio, or Twoing rule;
   means for determining an initial split of the data;
   means for determining a final split of the data using evolutionary algorithms and statistical sampling techniques;
   means for splitting the data; and
   means for combining said multiple decision trees in ensembles, wherein said means for determining the final split of the data using evolutionary algorithms and statistical sampling techniques is based on tests of linear combinations of attributes of the data obtained using evolutionary algorithms and statistical sampling techniques.

12. The oblique decision tree induction computer system based on evolutionary algorithms and statistical sampling techniques of claim 11, wherein said means for evaluating a potential split of the data utilizes Gini index only.

13. The oblique decision tree induction computer system based on evolutionary algorithms and statistical sampling techniques of claim 11, wherein said means for evaluating a potential split of the data utilizes information gain only.

14. The oblique decision tree induction computer system based on evolutionary algorithms and statistical sampling techniques of claim 11, wherein said means for evaluating a potential split of the data utilizes information ratio only.

15. The oblique decision tree induction computer system based on evolutionary algorithms and statistical sampling techniques of claim 11, wherein said means for evaluating a potential split of the data utilizes Twoing rule only.

16. The oblique decision tree induction computer system based on evolutionary algorithms and statistical sampling techniques of claim 11, wherein said means for determining an initial split of the data is based on tests on single attributes of the data or on random multivariate tests.

17. The oblique decision tree induction computer system based on evolutionary algorithms and statistical sampling techniques of claim 11, wherein said statistical sampling techniques are applied once at the beginning of an experiment or every time that a potential split is evaluated.

18. The oblique decision tree induction comuputer system based on evolutionary algorithms and statistical sampling techniques of claim 17, wherein said statistical sampling techniques include simple random sampling, where every data item has an equal probability of being selected, but other techniques are possible such as stratified sampling preserving the proportion of items of each class in the original data.

19. The oblique decision tree induction comuputer system based on evolutionary algorithms and statistical sampling techniques of claim 11, wherein said means for combining multiple decision trees in ensembles is based on plurality (usually called majority) voting.

20. The oblique decision tree induction comuputer system based on evolutionary algorithms and statistical sampling techniques of claim 12, wherein said means for combining multiple decision trees in ensembles is based on other combination techniques based on assigning different weights to each tree based on their accuracy or other criteria.

21. An oblique decision tree induction computer system for processing data based on evolutionary algorithms and statistical sampling techniques, comprising:
   a module to read the data;
   a module to sample the data;
   a module to sort the data;
   a module to create multiple decision trees using the following:
   a module to evaluate a potential split of the data according to Gini index, information gain, information ratio, or Twoing rule;
   a module to determine an initial split of the data;
   a module to determine a final split of the data using evolutionary algorithms and statistical sampling techniques;
   a module to split the data; and
   a module to combine said multiple decision trees in ensembles,
   wherein said module to determine the final split of the data using evolutionary algorithms and statistical sampling techniques is based on tests of linear combinations of attributes of the data obtained using evolutionary algorithms and statistical sampling techniques.

22. The oblique decision tree induction computer system based on evolutionary algorithms and statistical sampling techniques of claim 21, wherein said module to evaluate a potential split of the data utilizes Gini index only.

23. The oblique decision tree induction computer system based on evolutionary algorithms and statistical sampling techniques of claim 21, wherein said module to evaluate a potential split of the data utilizes information gain only.

24. The oblique decision tree induction computer system based on evolutionary algorithms and statistical sampling techniques of claim 21, wherein said module to evaluate a potential split of the data utilizes information ratio only.

25. The oblique decision tree induction computer system based on evolutionary algorithms and statistical sampling techniques of claim 21, wherein said module to evaluate a potential split of the data utilizes Twoing rule only.

26. The oblique decision tree induction computer system based on evolutionary algorithms and statistical sampling techniques of claim 21, wherein said module to determine the initial split of the data is based on tests on single attributes of the data or on random multivariate tests.

27. The oblique decision tree induction computer system based on evolutionary algorithms and statistical sampling techniques of claim 21, wherein said statistical sampling techniques are applied once at the beginning of an experiment or every time that a potential split is evaluated.

28. The oblique decision tree induction computer system based on evolutionary algorithms and statistical sampling techniques of claim 27, wherein said statistical sampling techniques include simple random sampling, where every data item has an equal probability of being selected, but other techniques are possible such as stratified sampling preserving the proportion of items of each class in the original data.

29. The oblique decision tree induction computer system based on evolutionary algorithms and statistical sampling techniques of claim 21, wherein said module to combine multiple decision trees in ensembles is based on plurality (usually called majority) voting.

30. The oblique decision tree inductioncomputer system based on evolutionary algorithms and statistical sampling techniques of claim 21, wherein said module to combine multiple decision trees in ensembles is based on other combination techniques based on assigning different weights to each tree based on their accuracy or other criteria.

* * * * *